United States Patent
Shyamala et al.

(10) Patent No.: US 12,255,928 B2
(45) Date of Patent: Mar. 18, 2025

(54) MACHINE LEARNING FOR COMPUTER SECURITY POLICY MODIFICATION

(71) Applicant: Capital One Services, LLC, McLean, VA (US)

(72) Inventors: Geeta Shyamala, Herndon, VA (US);
Lee Adcock, Midlothian, VA (US);
Vincent Pham, Seattle, WA (US);
Nahid Farhady Ghalaty, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 199 days.

(21) Appl. No.: 17/935,467

(22) Filed: Sep. 26, 2022

(65) Prior Publication Data

US 2024/0106866 A1    Mar. 28, 2024

(51) Int. Cl.
*H04L 9/40* (2022.01)
*G06N 3/08* (2023.01)

(52) U.S. Cl.
CPC ............ *H04L 63/205* (2013.01); *G06N 3/08* (2013.01); *H04L 63/10* (2013.01); *H04L 63/1425* (2013.01)

(58) Field of Classification Search
CPC ... H04L 63/205; H04L 63/10; H04L 63/1425; H04L 63/20; H04L 41/16; G06N 3/08; G06N 3/045; G06N 20/00; H04N 21/251; H04N 21/466; H04N 21/45; H04N 21/4662; G06F 7/023
See application file for complete search history.

(56) References Cited

U.S. PATENT DOCUMENTS

| | | | |
|---|---|---|---|
| 10,938,828 B1* | 3/2021 | Badawy | G06N 5/022 |
| 11,496,475 B2* | 11/2022 | Harguindeguy | H04L 63/0807 |
| 11,640,470 B1* | 5/2023 | Amar | G06Q 10/0635 726/22 |
| 2019/0068627 A1* | 2/2019 | Thampy | H04L 63/1425 |
| 2021/0073282 A1* | 3/2021 | Hunter | G06N 3/086 |
| 2021/0240836 A1* | 8/2021 | Hazony | G09B 5/00 |
| 2021/0248445 A1* | 8/2021 | Zhou | G06F 18/2115 |
| 2023/0006976 A1* | 1/2023 | Jakobsson | H04L 9/50 |
| 2023/0176840 A1* | 6/2023 | Zhou | G06F 8/451 717/151 |
| 2023/0244197 A1* | 8/2023 | Maruyama | G05B 23/024 700/295 |

* cited by examiner

*Primary Examiner* — Michael Won
(74) *Attorney, Agent, or Firm* — Foley & Lardner LLP (57) ABSTRACT

In some aspects, a computing system may use a machine learning model to determine whether a computer security policy should be modified to reduce the likelihood of a cyber security incident. Through the use of a machine learning model, unsafe combinations of access grants or permissions may be identified and modified to prevent cyber security incidents from occurring. The computing system may input a representation of a computer security policy into a machine learning model, which has been trained on a dataset that includes representations of computer security policies. The computing system may generate output indicating a likelihood that the first computing system will be involved in a cyber security incident. Based on the output satisfying a first threshold, the computing system may generate a recommendation to modify the first computer security policy. The computing system may modify the first computer security policy based on the recommendation.

20 Claims, 4 Drawing Sheets

MACHINE LEARNING FOR COMPUTER SECURITY POLICY MODIFICATION

BACKGROUND

Computer security policies form the basis of security for technology infrastructure of organizations. Computer security policies regulate behaviors of computing systems by granting access to systems and functionality. They can help to minimize the risks of being hacked, information leaks, and may safeguard an organization's data and other resources. Without computer security policies, organizations may be at risk of security breaches and other security consequences. A computer security policy may specify data types that can and cannot move to the cloud, what systems are authorized to access or migrate data (e.g., to the cloud), what systems are authorized to communicate with each other, and a variety of other computer security-related controls.

SUMMARY

Due to the vast number of computing systems an organization employs, a computer security policy that governs one or more of the computing systems may become overly complex. Many computing systems in an organization means that complicated permissions and accesses may be required for a computing system to function properly. By the same token, however, as computer security policies become more complicated, there is an increased chance for a cyber security breach. In some cases, many permissions and access grants are layered on top of each other in a single computer security policy making it difficult to know and control the likelihood that a computer security incident arises due to a poor policy. For example, it may be relatively safe for system A to access system B and for system C to access system D. On the other hand, it may be very dangerous from a cyber security perspective to have system A have access to system D. For example, through the access grant, it may become easy for a malicious actor to gain access to very sensitive data. However, due to the complicated nature of an organization's computing systems, it may be difficult to know which combination of access grants or permissions are more likely to result in cyber security incidents.

To address these issues, non-conventional methods and systems described herein use a machine learning model to determine whether a computer security policy should be modified to reduce the likelihood of a cyber security incident. Through the use of a machine learning model, unsafe combinations of access grants or permissions may be identified and modified to prevent cyber security incidents from occurring. However, attempting to use machine learning in this way creates a novel technical problem because it is unknown how to structure computer security policy-related data to enable a machine learning model to train and generate useful output. To solve this novel technical problem, non-conventional systems and methods described herein generate a representation of a computer security policy, for example, by creating a graph structure and generating a graph embedding based on the graph structure. Notably, the versatility in representing data in diverse manners provided by the use of graph structures allows the system to interpret the nuances of the data structures of computer security policy. By doing so, a computing system may be enabled to identify computer security policies that should be modified to improve the security of computer systems to which the computer security policies have been applied. Further, a computing system is improved because the computing system is enabled to identify and modify computer security policies without user input.

In some aspects, a computing system may receive, from a user device, a first computer security policy comprising an indication of a plurality of systems that a first computing system has access to, and a plurality of permissions granted to the first computing system. The computing system may generate a representation of the first computer security policy by using the first computer security policy to create a graph structure and generating a graph embedding based on the graph structure. The computing system may input the representation of the first computer security policy into a machine learning model, the machine learning model having been trained on a dataset that includes representations of computer security policies associated with a plurality of computing systems and labels indicating urgency levels of cyber security incidents associated with the plurality of computer security policies. The computing system may generate, via the machine learning model and based on the portion of the first computer security policy, output indicating a likelihood that the first computing system will be involved in a cyber security incident. Based on the output satisfying a first threshold, the computing system may generate a recommendation to modify the first computer security policy. The recommendation may suggest removing a first permission from the first computer security policy or lowering a cyber security threat detection threshold for the first computer security policy such that an intrusion detection system is more likely to flag anomalous activity associated with the first computing system as a cyber security incident. The computing system may send the recommendation to the user device or may modify the first computer security policy based on the recommendation.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
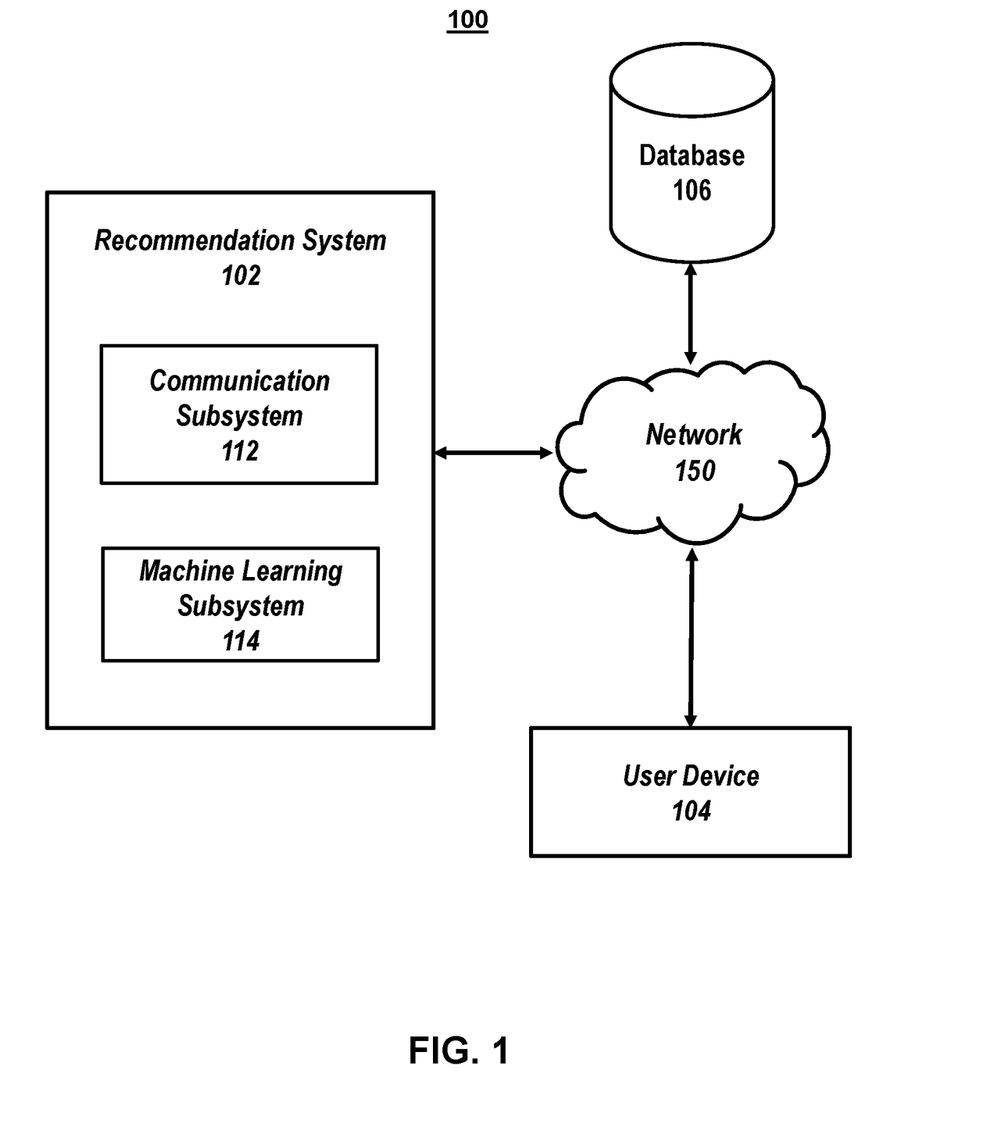
FIG. 1 shows an illustrative diagram for using machine learning to modify a computer security policy, in accordance with one or more embodiments.

FIG. 1 shows an illustrative system 100 for using machine learning to modify a computer security policy. The system 100 includes a recommendation system 102, a database 106, and a user device 104 that may communicate with each other via a network 150. The recommendation system 102 may include a communication subsystem 112, a machine learning subsystem 114, or other components.

The recommendation system 102 may obtain a computer security policy. For example, the recommendation system 102 may receive (e.g., via the communication subsystem 112) a computer security policy from the user device 104. A computer security policy may include any data that defines relationships between computing systems. A computer security policy may indicate what functionality or access is permissible for a computing system. In some embodiments, a computer security policy may be enforced using a variety of software applications or other computer code. A computer security policy may include an indication of a plurality of systems that a first computing system has access to. For example, the computer security policy may indicate that the first computing system has access to a database associated with credit cards, a system that is responsible for making wire transfers, a cloud system, or other computing device described in connection with FIG. 3, or a variety of other computing systems. The computer security policy may include a plurality of permissions granted to the first computing system. For example, the plurality of permissions may include a permission to access an API, a permission to connect to the internet, a permission to modify data in a database, or a variety of other permissions. The computer security policy may indicate which computing systems have applied the computer security policy. For example, the computer security policy may include an identification of a server to which the computer security policy has been applied.

A computer security policy may be designed or used to prevent cyber security incidents. A cyber security incident may include a breach in a computer system or a loss of data. A cyber security incident may include an occurrence that actually or imminently jeopardizes, without lawful authority, the integrity, confidentiality, or availability of information or an information system; or constitutes a violation or imminent threat of violation of law, security policies, security procedures, or acceptable use policies.

The recommendation system 102 may generate a representation of the computer security policy. For example, the recommendation system 102 may generate a graphical representation of the computer security policy. The recommendation system may create a graph structure with each node in the graph representing a permission, access grant, or computing system to which the computer security policy has been applied. The recommendation system 102 may use the machine learning subsystem 114 to generate a vector representation (e.g., embedding) based on the graph structure. The same or similar representations may be generated for computer security policies in a dataset used to train a machine learning model as described below. By doing so, the recommendation system 102 may transform the computer security policy into data that is usable by a machine learning model. This may enable the machine learning model to generate output indicating the likelihood of a cyber security incident as described in more detail below.

For example, a graph structure may comprise a finite set of vertices, also called nodes, and a finite set of ordered pairs of the form (u, v) called an edge. Notably, the pair is ordered because (u, v) is not the same as (v, u) in the case of a directed graph (di-graph). As such, the data represented by the graph may better capture nuances in the computer security policies through this extra degree of relationships. The pair of the form (u, v) indicates that there is an edge from vertex u to vertex v. Accordingly, the edges may contain weight/value/cost.

In some embodiments, the graph data may be structured as an adjacency matrix, which is a 2D array of size V×V where V is the number of vertices in a graph. In such cases, the system may use a 2D array such that adj[ ][ ], a slot adj[i][j]=1 indicates that there is an edge from vertex i to vertex j. Notably, an adjacency matrix for an undirected graph may be symmetric. The adjacency matrix may also represent weights assigned between data. For example, if adj[i][j]=w, then there is an edge from vertex i to vertex j with weight w. Adjacency matrices may make security policy representation easier to implement and follow. For example, as the security policies are updated and modified, the graph data may reflect this by removing an edge, which takes O(1) time (e.g., a small increment of time). Furthermore, the modification of the edges does not impact other graph data. Furthermore, queries like whether there is an edge from vertex 'u' to vertex 'v' are efficient and can be done O(1). As such, the adjacency matrix is ideal for storing data with numerous nuances that may change frequently, as in security policies. Adding a vertex may be O(V^2) time. Computing all neighbors of a vertex takes O(V) time. In some embodiments, computer security policies may be less resource dependent (e.g., may avoid consuming mass amounts of storage space); thus storage concerns are less impactful. Additionally, security updates may occur in version updates that are added at routine and predetermined times (e.g., instances of low usage), which mitigates issues related to the computing time for all neighbors of a vertex.

Additionally, or alternatively, the system may use an adjacency list. In such cases, an array of lists is used. The size of the array is equal to the number of vertices, which may be expanded based on the needs of the security policy. For example, a portion of a computer security policy may be represented as an array[ ]. An entry array[i] represents the list of vertices adjacent to the vertex. This representation can also be used to represent a weighted graph. The weights of edges can be represented as lists of pairs. Notably, the adjacency list saves space O(|V|+|E|). In the worst case, there can be C(V, 2) number of edges in a graph thus consuming O(V^2) space.

The recommendation system 102 may input a portion of the computer security policy into a machine learning model. The portion of the computer security policy may include the representation of the computer security policy generated at step 404. For example, the recommendation system 102 (e.g., the machine learning subsystem 114) may generate a vector representation (e.g., embedding) of a portion of the computer security policy and input the vector representation into the machine learning model. The machine learning model may have been trained on a dataset that includes a plurality of computer security policies. The dataset may include second order access data that indicates access of computing systems that are one degree removed from a computing system of the plurality of computing systems. For example, if the first computing system has access to a second computing system due to access rights granted by the computer security policy, the training dataset may include data indicating systems that the second computing system has access to.

By training the machine learning model using the dataset described above, the recommendation system 102 may be able to use the model to generate output for any given computer security policy to determine whether the policy should be modified to reduce the likelihood of a cyber security incident. In this way, the recommendation system 102 provides the ability to modify policies before incidents occur, making computer systems more secure.

In some embodiments, the recommendation system 102 may generate a representation of portions of the dataset used to train the machine learning model. For example, the recommendation system 102 may generate graph embeddings for each computer security policy in the dataset.

In some embodiments, the dataset used to train the machine learning model may include a plurality of closure codes associated with cyber security incident reports. A closure code may indicate the outcome of an investigation that was performed in response to a cyber security incident. A closure code may include an identification of a malicious actor associated with a cyber security incident. For example, each closure code of the plurality of closure codes may indicate whether an external malicious actor, an internal malicious actor, or no malicious actor was involved in a corresponding cyber security incident. By identifying a malicious actor in training data, the machine learning model may be able to more accurately determine a risk level or a probability of a cyber security incident occurring in connection with other computer security policies (e.g., other computer security policies that are external to the training dataset).

In some embodiments, the machine learning model may generate output indicating a predicted closure code for a future cyber security incident associated with a computer security policy. For example, the recommendation system 102 may generate, via the machine learning model and based on the portion of the computer security policy, output indicating a predicted closure code for a future cyber security incident associated with the first computing system. The closure code may indicate severity level associated with the cyber security incident. In some embodiments, the training dataset may indicate additional layers of computer system access (e.g., second order access data).

Figure 2:
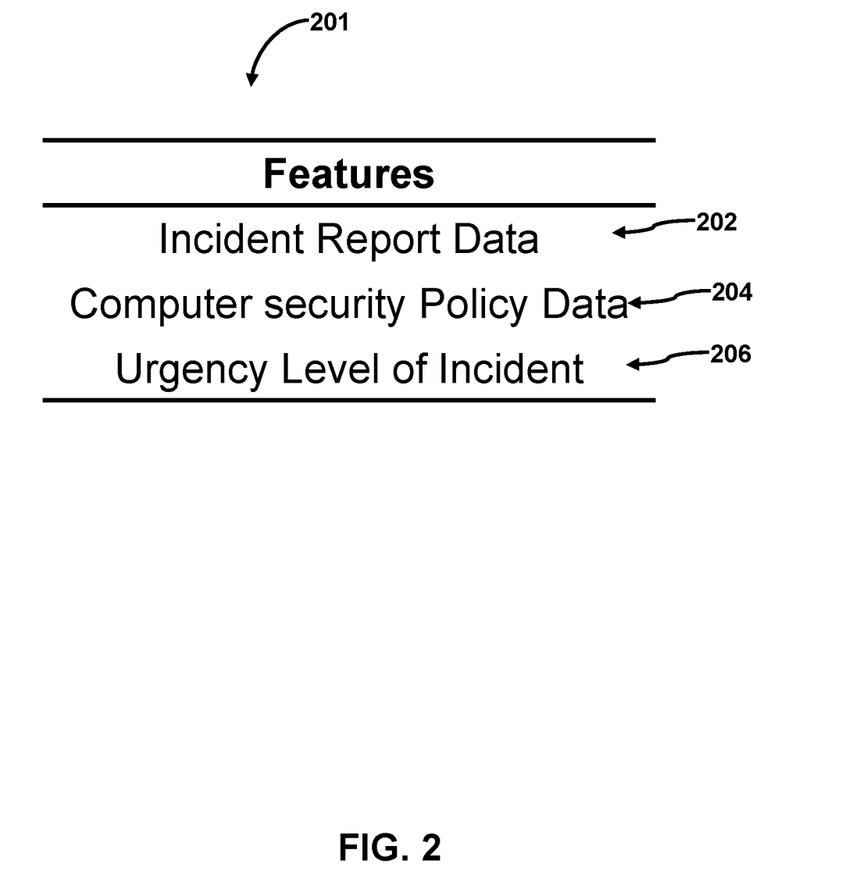
FIG. 2 shows example features that may be included in a dataset for training the machine learning model, in accordance with one or more embodiments.

Referring to FIG. 2, example features 201 that may be included in a dataset for training the machine learning model (e.g., as described in connection with FIG. 1 or FIG. 4) are shown. A dataset may include incident report data 202. An incident report may be generated in response to a cyber security incident and may include identification of one or more computing systems involved in the cyber security incident. The incident report data 202 may include an identification of one or more policies applied to the one or more computing systems involved in the cyber security incident. The incident report data 202 may include a closure code that indicates how the cyber security incident was resolved. The closure code may indicate the severity of the cyber security incident. The closure code may indicate whether an external actor (e.g., external to an organization) or an internal actor (e.g., internal to an organization) was responsible for the cyber security incident. The closure code may indicate that the cyber security incident was a false alarm and that there was no threat. The dataset may include computer security policy data 204, which may include any data associated with a computer security policy described above. The computer security policy data 204 may include network policy data, which may indicate any systems that are restricted from accessing a network resource and may identify any system that is allowed to access the network. The computer security policy may include software security policy data that indicates what software may be installed on a computer system. The computer security policy data 204 may include information protection policy data, which may indicate what systems may access what information, how to process information, how to store information, or how the information should be transferred. The urgency level of incident 206 may indicate a priority level for addressing the cyber security incident (e.g., low, medium, high, etc.). The urgency level of incident 206 may be used as labels for the dataset to train the machine learning model. In some embodiments, each row of a dataset may include some or all of the above data as columns, with the urgency level 206 as the label for the row. In some embodiments, each row may correspond to a single cyber security policy and the number of cyber security incidents that have occurred in association with the cyber security policy may be used as a label for the row.

The recommendation system 102 may generate output indicating a likelihood that a first computing system will be involved in a cyber security incident. For example, the output may be a value between 0 and 1 (e.g., a probability) that the first computing system will be involved in a cyber security incident. The output may correspond to a threshold time within which the first computing system is expected to be involved in a cyber security incident. For example, the output may indicate a probability that the first computing system is expected to be involved in a cyber security incident within the next 12 months, 5 years, or a variety of other time periods.

The recommendation system 102 may compare the output with a threshold. If the output satisfies the threshold, the recommendation system 102 may generate a recommendation indicating that the computer security policy should be changed. Alternatively, if the output fails to satisfy the threshold, the recommendation system 102 may generate a recommendation indicating that the security policy does not need to be changed. By doing so, the recommendation system 102 may identify changes that should be made to a computer policy, which may enable the prevention of cyber security incidents (e.g., cyber security breaches, data loss or theft, etc.). In this way, computer systems are made more secure.

The recommendation system 102 may generate a recommendation to modify the first computer security policy. For example, based on the output of a machine learning model satisfying a first threshold, the recommendation system 102 may generate a recommendation to modify the first computer security policy. The recommendation may indicate that one or more permissions should be removed from the first computer security policy. The recommendation may indicate that a threshold for cyber security threat detection should be lowered. The threshold may be associated with the first computer security policy. For example, by lowering the cyber security threat detection threshold, an intrusion detection system may be more likely to flag activity (e.g., potentially anomalous activity) associated with the first computing system as a cyber security incident. By generating a recommendation, one or more systems may be notified and may be able to adjust the first computer security policy to make the first computing system more secure.

The recommendation system 102 may send the recommendation to a user device or modifies the first computer security policy. Additionally, or alternatively, the user device 104 may cause modification of the first computer security policy. For example, the recommendation system 102 may modify the first computer security policy based on the recommendation generated via the machine learning model. The recommendation system 102 may remove one or more permissions from the first computer security policy. For example, the recommendation system 102 may remove access to the Internet from the first computer security policy. As an additional example, the recommendation system 102 may remove an ability of the first computing system to access a database by modifying the first computer security policy. Doing so may cause the first computing system to no longer be able to communicate via the Internet (e.g., the first computing system may be restricted to communicating via a local area network or may be restricted to communicating with certain devices that belong to the same organization as the first computing system).

In some embodiments, the recommendation system 102 may iteratively generate recommendation based on modifications that are made to a computer security policy. A user may make modifications to a computer security policy and the recommendation system 102 may cause display of a risk or likelihood of a cyber security incident with each change that is made to the policy. For example, one or more recommendations may include a threat level (e.g., a likelihood of a cyber security incident). The recommendation system 102 may cause display of the first threat level via a user interface. Based on detecting a modification to the first computer security policy, the recommendation system 102 may generate a second threat level associated with the modified computer security policy. The recommendation system 102 may cause display of the second threat level via a user interface that is displayed to the user.

In some embodiments, the recommendation system 102 may modify a computer security policy by lowering a detection threshold associated with the policy. For example, if a likelihood of a cyber security incident is greater than a first threshold, the recommendation system 102 may cause a second threshold to be lowered. The second threshold may make it more likely that an intrusion detection system will flag activity associated with the computer security policy (e.g., actions performed by one or more computing systems to which the computer security policy has been applied) as anomalous (e.g., indicating that the activity is a cyber security incident). For example, a recommendation may further indicate lowering a cyber security threat detection threshold for the first computer security policy such that an intrusion detection system is more likely to flag activity associated with the first computing system as a cyber security incident.

In some embodiments, the recommendation system 102 may determine that a machine learning model should not be used to generate a recommendation for a computer security policy. The recommendation system 102 may determine that the machine learning model should not be used, for example, based on determining that the computer security policy is not similar (e.g., does not meet a similarity threshold, etc.) to data in the dataset used to train the machine learning model. In some embodiments, the recommendation system 102 may use counterfactual samples to determine that the computer security policy is not similar to the training data. For example, the recommendation system 102 may receive, from the user device, a second computer security policy. The recommendation system 102 may determine, based on a comparison with a counterfactual sample associated with the second computer security policy, that the second computer security policy does not meet a similarity threshold associated with the dataset used to train the machine learning model. Instead of generating a recommendation, the recommendation system 102 may modify the computer security policy or modify a detection threshold associated with the computer security policy. For example, in response to the second computer security policy not meeting the similarity threshold, the recommendation system 102 may lower a cyber security threat detection threshold for the second computer security policy.

Figure 3:
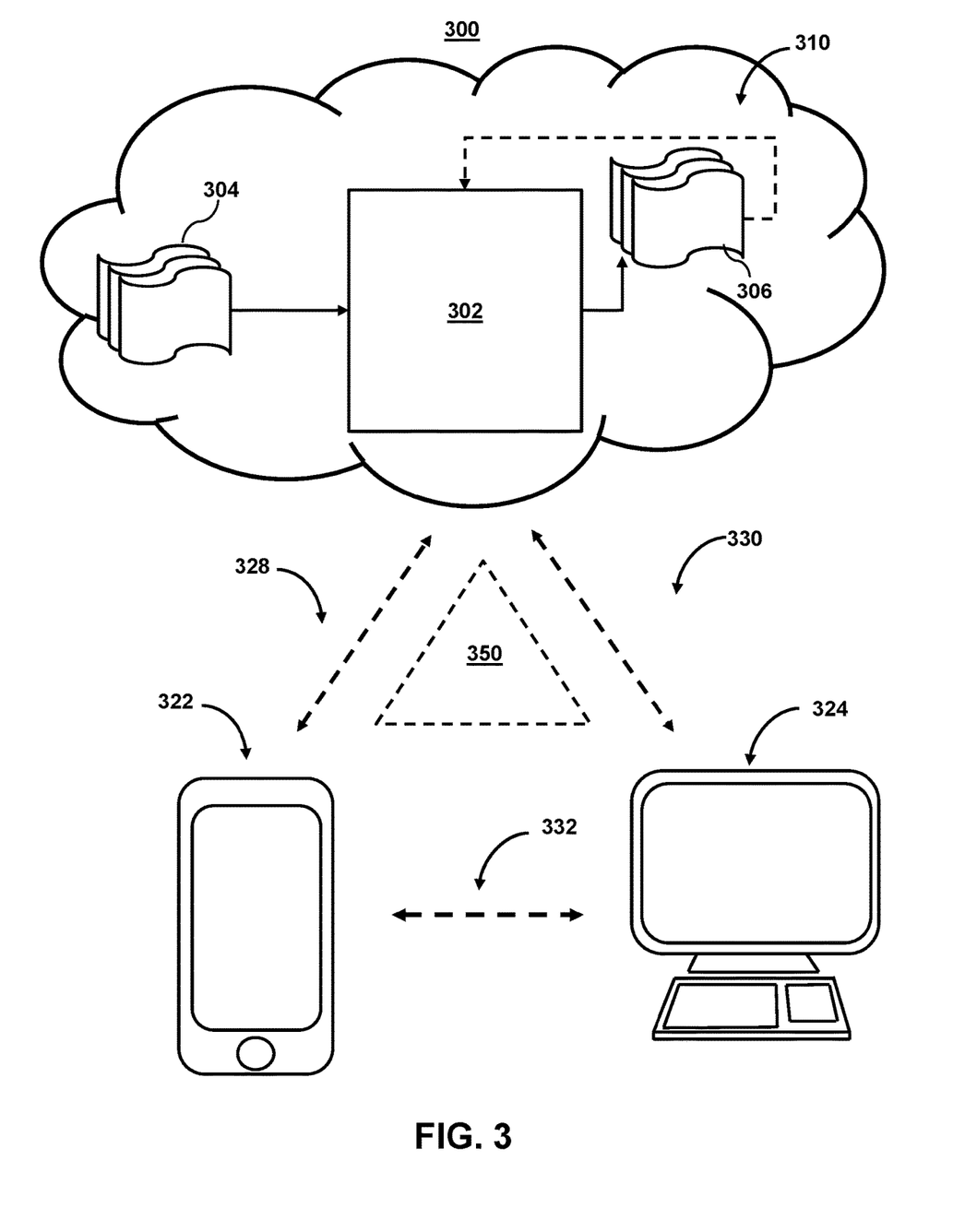
FIG. 3 shows illustrative components for a system that uses machine learning to improve cyber security, in accordance with one or more embodiments.

FIG. 3 shows illustrative components for a system 300 used for configuration of machine learning models for different purposes (e.g., to generate recommendations to modify computer security policies or to modify computer security policies as described above in connection with FIGS. 1, 2, and 4), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2, and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) a system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the recommendation system 102 or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., to generate recommendations to modify computer security policies or to modify computer security policies as described above in connection with FIGS. 1, 2, and 4).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may generate recommendations to modify computer security policies or to modify computer security policies as described above in connection with FIGS. 1, 2, and 4.

System 300 also includes application programming interface (API) layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols, such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
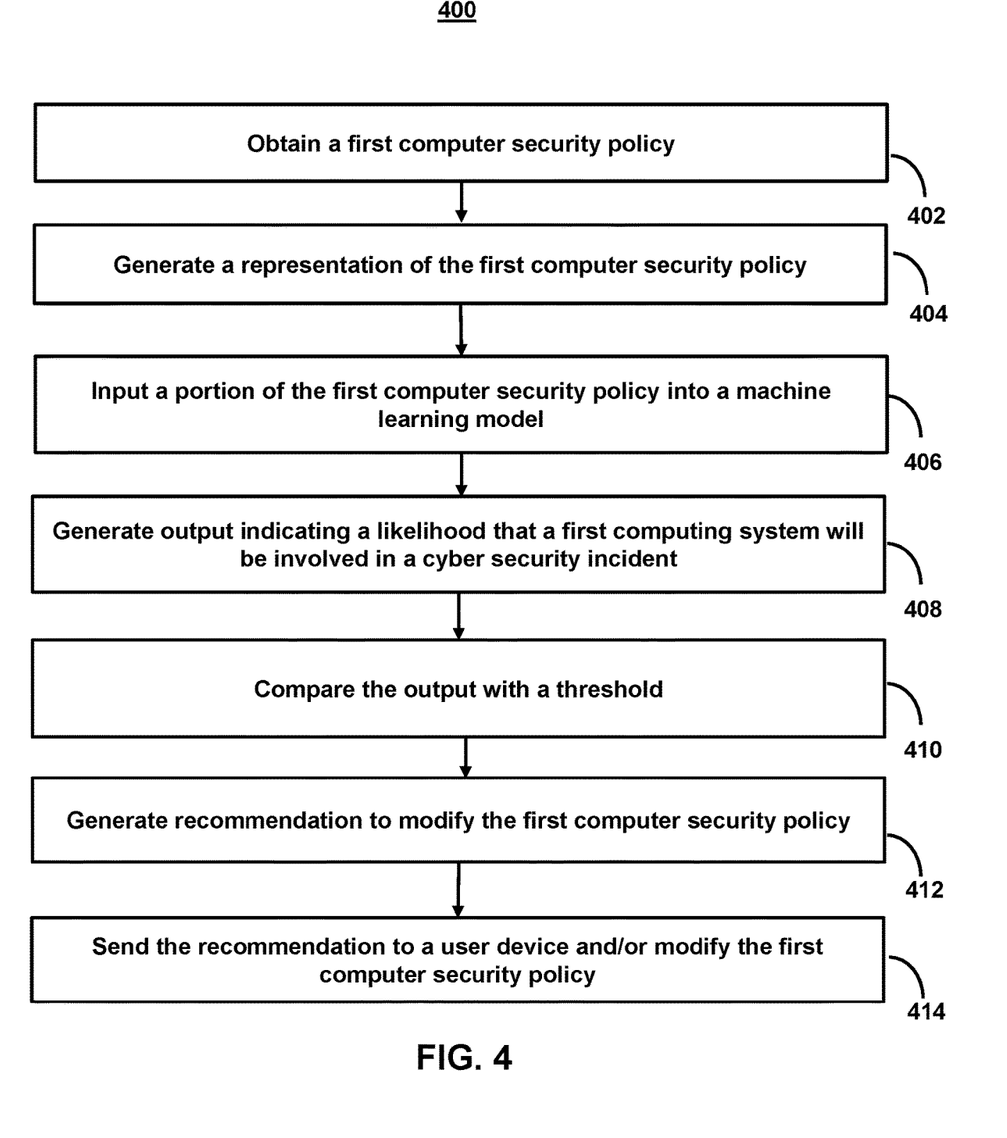
FIG. 4 shows a flowchart of the steps involved in using machine learning to improve a computer security policy, in accordance with one or more embodiments.

FIG. 4 shows a flowchart of the steps involved in using machine learning for information retrieval, in accordance with one or more embodiments. Although described as being performed by the recommendation system 102, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, the recommendation system 102 obtains a computer security policy. For example, the recommendation system 102 may receive a computer security policy from the user device 104. The computer security policy may include an indication of a plurality of systems that a first computing system has access to. For example, the computer security policy may indicate that the first computing system has access to a database associated with credit cards or a system that is responsible for making wire transfers, or a variety of other computing systems. The computer security policy may include a plurality of permissions granted to the first computing system. For example, the plurality of permissions may include a permission to access an API, a permission to connect to the Internet, a permission to modify data in a database, or a variety of other permissions. The computer security policy may indicate which computing systems have applied the computer security policy. For example, the computer security policy may include an identification of a server to which the computer security policy has been applied.

At step 404, the recommendation system 102 generates a representation of the first computer security policy. For example, the recommendation system 102 may generate a representation of the first computer security policy by using the first computer security policy to create a graph structure and may generate a graph embedding based on the graph structure. Additionally, or alternatively, the recommendation system 102 may generate a representation as described above in connection with FIG. 1. The same or similar representations may be generated for computer security policies in a dataset used to train a machine learning model as described below. By doing so, the recommendation system 102 may transform the first computer security policy into data that is usable by a machine learning model. This may enable the machine learning model to generate output indicating the likelihood of a cyber security incident as described in more detail below.

At step 406, the recommendation system 102 inputs a portion of the first computer security policy into a machine learning model. The portion of the first computer security policy may include the representation of the first computer security policy generated at step 404. For example, the recommendation system 102 (e.g., the machine learning subsystem 114) may generate a vector representation (e.g., embedding) of a portion of the first computer security policy and input the vector representation into the machine learning model. The machine learning model may have been trained on a dataset that includes a plurality of computer security policies. The dataset may include second order access data that indicates access of computing systems that are one degree removed from a computing system of the plurality of computing systems (e.g., as described above in connection with FIG. 1). By training the machine learning model using the dataset described above, the recommendation system 102 may be able to use the model to generate output for any given computer security policy to determine whether the policy should be modified to reduce the likelihood of a cyber security incident. In this way, the recommendation system 102 provides the ability to modify policies before incidents occur, making computer systems more secure.

In some embodiments, the recommendation system 102 may generate a representation of portions of the dataset used to train the machine learning model. For example, the recommendation system 102 may generate graph embeddings for each computer security policy in the dataset.

In some embodiments, the dataset used to train the machine learning model may include a plurality of closure codes associated with cyber security incident reports. A closure code may indicate the outcome of an investigation that was performed in response to a cyber security incident. A closure code may include an identification of a malicious actor associated with a cyber security incident. For example, each closure code of the plurality of closure codes may indicate whether an external malicious actor, an internal malicious actor, or no malicious actor was involved in a corresponding cyber security incident. By identifying a malicious actor in training data, the machine learning model may be able to more accurately determine a risk level or a probability of a cyber security incident occurring in connection with other computer security policies (e.g., other computer security policies that are external to the training dataset).

In some embodiments, the machine learning model may generate output indicating a predicted closure code for a future cyber security incident associated with a computer security policy. For example, the recommendation system 102 may generate, via the machine learning model and based on the portion of the first computer security policy, output indicating a predicted closure code for a future cyber security incident associated with the first computing system. The closure code may indicate severity level associated with the cyber security incident.

In some embodiments, the training dataset may indicate additional layers of computer system access (e.g., second order access data.). Second order access data may indicate access of computing systems that are one degree removed from the other computing systems. For example, if the first computing system has access to a second computing system due to access rights granted by the first computer security policy, the training dataset may include data indicating systems that the second computing system has access to.

At step 408, the recommendation system 102 generates output indicating a likelihood that a first computing system will be involved in a cyber security incident. For example, the output may be a value between 0 and 1 (e.g., a probability) that the first computing system will be involved in a cyber security incident. The output may correspond to a threshold time within which the first computing system is expected to be involved in a cyber security incident. For example, the output may indicate a probability that the first computing system is expected to be involved in a cyber security incident within the next 12 months, 5 years, or a variety of other time periods.

At step 410, the recommendation system 102 compares the output with a threshold. If the output satisfies the threshold, the recommendation system 102 may generate a recommendation indicating that the computer security policy should be changed. Alternatively, if the output fails to satisfy the threshold, the recommendation system 102 may generate a recommendation indicating that the security policy does not need to be changed. By doing so, the recommendation system 102 may identify changes that should be made to a computer policy, which may enable the prevention of cyber security incidents (e.g., cyber security breaches, data loss or theft, etc.). In this way, computer systems are made more secure.

At step 412, the recommendation system 102 generates a recommendation to modify the first computer security policy. For example, based on the output (e.g., in step 410) satisfying a first threshold, the recommendation system 102 may generate a recommendation to modify the first computer security policy. The recommendation may indicate that one or more permissions should be removed from the first computer security policy. The recommendation may indicate that a threshold for cyber security threat detection should be lowered. The threshold may be associated with the first computer security policy. For example, by lowering the cyber security threat detection threshold, an intrusion detection system may be more likely to flag activity (e.g., potentially anomalous activity) associated with the first computing system as a cyber security incident. By generating a recommendation, one or more systems may be notified and may be able to adjust the first computer security policy to make the first computing system more secure.

At step 414, the recommendation system 102 sends the recommendation to a user device or modifies the first computer security policy. Additionally, or alternatively, the user device 104 may cause modification of the first computer security policy. For example, the recommendation system 102 may modify the first computer security policy based on the recommendation generated via the machine learning model. The recommendation system 102 may remove one or more permissions from the first computer security policy. For example, the recommendation system 102 may remove access to the Internet from the first computer security policy. As an additional example, the recommendation system 102 may remove an ability of the first computing system to access a database by modifying the first computer security policy. Doing so may cause the first computing system to no longer be able to communicate via the Internet (e.g., the first computing system may be restricted to communicating via a local area network or may be restricted to communicating with certain devices that belong to the same organization as the first computing system).

In some embodiments, the recommendation system 102 may iteratively generate recommendations based on modifications that are made to a computer security policy. A user may make modifications to a computer security policy and the recommendation system 102 may cause display of a risk or likelihood of a cyber security incident with each change that is made to the policy. For example, one or more recommendations may include a threat level (e.g., a likelihood of a cyber security incident). The recommendation system 102 may cause display of the first threat level via a user interface. Based on detecting a modification to the first computer security policy, the recommendation system 102 may generate a second threat level associated with the modified computer security policy. The recommendation system 102 may cause display of the second threat level via a user interface that is displayed to the user.

In some embodiments, the recommendation system 102 may modify a computer security policy by lowering a detection threshold associated with the policy. For example, if a likelihood of a cyber security incident is greater than a first threshold, the recommendation system 102 may cause a second threshold to be lowered. The second threshold may make it more likely that an intrusion detection system will flag activity associated with the computer security policy (e.g., actions performed by one or more computing systems to which the computer security policy has been applied) as anomalous (e.g., indicating that the activity is a cyber security incident). For example, a recommendation may further indicate lowering a cyber security threat detection threshold for the first computer security policy such that an intrusion detection system is more likely to flag activity associated with the first computing system as a cyber security incident.

In some embodiments, the recommendation system 102 may determine that a machine learning model should not be used to generate a recommendation for a computer security policy. The recommendation system 102 may determine that the machine learning model should not be used, for example, based on determining that the computer security policy is not similar (e.g., does not meet a similarity threshold, etc.) to data in the dataset used to train the machine learning model. In some embodiments, the recommendation system 102 may use counterfactual samples to determine that the computer security policy is not similar to the training data. For example, the recommendation system 102 may receive, from the user device, a second computer security policy. The recommendation system 102 may determine, based on a comparison with a counterfactual sample associated with the second computer security policy, that the second computer security policy does not meet a similarity threshold associated with the dataset used to train the machine learning model. Instead of generating a recommendation, the recommendation system 102 may modify the computer security policy or modify a detection threshold associated with the computer security policy. For example, in response to the second computer security policy not meeting the similarity threshold, the recommendation system 102 may lower a cyber security threat detection threshold for the second computer security policy.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for using cyber security incident and system data to generate recommendations for computer security policy modifications comprising: obtaining a first computer security policy comprising an indication of a plurality of systems that a first computing system has access to, and a plurality of permissions granted to the first computing system; inputting a portion of the first computer security policy into a machine learning model, the machine learning model having been trained on a dataset that includes representations of computer security policies associated with a plurality of computing systems and labels indicating urgency levels of cyber security incidents associated with the plurality of computer security policies; generating, via the machine learning model and based on the portion of the first computer security policy, output indicating a likelihood that the first computing system will be involved in a cyber security incident; based on the output satisfying a first threshold, generating a recommendation to modify the first computer security policy; and sending the recommendation to the user device.
2. The method of any of the preceding embodiments, wherein the recommendation comprises a first threat level, the method further comprising: causing display of the first threat level via a user interface; based on detecting a modification to the first computer security policy, generating a second threat level associated with the modified computer security policy; and causing display of the second threat level via the user interface.
3. The method of any of the preceding embodiments, wherein the dataset further comprises a plurality of closure codes associated with the cyber security incidents, wherein each closure code of the plurality of closure codes indicates whether an external malicious actor, an internal malicious actor, or no malicious actor was involved in a corresponding cyber security incident.
4. The method of any of the preceding embodiments, further comprising: generating, via the machine learning model and based on the portion of the first computer security policy, output indicating a predicted closure code for a future cyber security incident associated with the first computing system.
5. The method of any of the preceding embodiments, wherein the dataset further comprises second order access data indicating access of computing systems that are one degree removed from the plurality of computing systems.
6. The method of any of the preceding embodiments, wherein the recommendation further indicates lowering a cyber security threat detection threshold for the first computer security policy such that an intrusion detection system is more likely to flag activity associated with the first computing system as a cyber security incident.
7. The method of any of the preceding embodiments, wherein the recommendation indicates removing an ability of the first computing system to access a database from the first computer security policy.
8. The method of any of the preceding embodiments, wherein the recommendation indicates replacing a first permission indicated in the first computer security policy with a second permission.
9. The method of any of the preceding embodiments, further comprising: receiving, from the user device, a second computer security policy; determining, based on a comparison with a counterfactual sample associated with the second computer security policy, that the second computer security policy does not meet a similarity threshold associated with the dataset used to train the machine learning model; and, in response to the second computer security policy not meeting the similarity threshold, lowering a cyber security threat detection threshold for the second computer security policy.
10. The method of any of the preceding embodiments, wherein the machine learning model comprises a neural network model or a linear regression model.
11. A tangible, non-transitory, machine-readable medium storing instructions that, when executed by a data processing apparatus, cause the data processing apparatus to perform operations comprising those of any of embodiments 1-10.
12. A system comprising one or more processors; and memory storing instructions that, when executed by the processors, cause the processors to effectuate operations comprising those of any of embodiments 1-10.
13. A system comprising means for performing any of embodiments 1-10.

What is claimed is:

1. A machine learning system for using cyber security incident and system data to generate recommendations for computer security policy modifications, the machine learning system comprising:
   one or more processors; and
   a non-transitory, computer-readable medium having instructions recorded thereon that, when executed by the one or more processors, cause operations comprising:
      receiving, from a user device, a first computer security policy comprising (i) an indication of a plurality of systems to which a first computing system has access and (ii) a plurality of permissions granted to the first computing system;
      generating a graph embedding of the first computer security policy by using the first computer security policy to create a graph structure and generating the graph embedding based on the graph structure;
      inputting the graph embedding of the first computer security policy into a machine learning model to generate a likelihood indication of the first computing system's future involvement in a cyber security incident, the machine learning model having been trained on a dataset that includes representations of computer security policies associated with a plurality of computing systems and labels indicating urgency levels of cyber security incidents associated with the computer security policies, wherein the dataset further comprises second order access data indicating access of computing systems that are one degree removed from the plurality of computing systems;
      based on the likelihood indication of the first computing system's future involvement in the cyber security incident satisfying a first threshold, generating a recommendation indicating (i) removing a first permission from the first computer security policy and (ii) lowering a cyber security threat detection threshold for the first computer security policy such that an intrusion detection system is more likely to flag anomalous activity associated with the first computing system as a cyber security incident; and
      sending the recommendation to the user device.

2. A method for using cyber security incident and system data to generate recommendations for computer security policy modifications comprising:
   obtaining a first computer security policy comprising an indication of a plurality of systems that a first computing system has access to, and a plurality of permissions granted to the first computing system;
   generating a graph embedding of the first computer security policy by using the first computer security policy to create a graph structure and generating the graph embedding based on the graph structure;
   inputting the graph embedding of the first computer security policy into a machine learning model, the machine learning model having been trained on a dataset that includes representations of computer security policies associated with a plurality of computing systems and labels indicating urgency levels of cyber security incidents associated with the computer security policies, wherein the dataset further comprises second order access data indicating access of computing systems that are one degree removed from the plurality of computing systems;
   generating, via the machine learning model and based on inputting the graph embedding of the first computer security policy into the machine learning model, an output indicating a likelihood that the first computing system will be involved in a cyber security incident;
   based on the output satisfying a first threshold, generating a recommendation to remove a first permission from the first computer security policy; and
   sending the recommendation to a user device.

3. The method of claim 2, wherein the recommendation comprises a first threat level, the method further comprising:
   causing display of the first threat level via a user interface;
   based on detecting a modification to the first computer security policy, generating a second threat level associated with the modified first computer security policy; and
   causing display of the second threat level via the user interface.

4. The method of claim 2, wherein the dataset further comprises a plurality of closure codes associated with the cyber security incidents, wherein each closure code of the plurality of closure codes indicates whether an external malicious actor, an internal malicious actor, or no malicious actor was involved in a corresponding cyber security incident.

5. The method of claim 4, further comprising:
   generating, via the machine learning model and based on the graph embedding of the first computer security policy, a second output indicating a predicted closure code for a future cyber security incident associated with the first computing system.

6. The method of claim 2, wherein the recommendation further indicates lowering a cyber security threat detection threshold for the first computer security policy such that an intrusion detection system is more likely to flag activity associated with the first computing system as a cyber security incident.

7. The method of claim 2, wherein the recommendation indicates removing an ability of the first computing system to access a database from the first computer security policy.

8. The method of claim 2, wherein the recommendation indicates replacing the first permission indicated in the first computer security policy with a second permission.

9. The method of claim 2, further comprising:
   receiving, from the user device, a second computer security policy;
   determining, based on a comparison with a counterfactual sample associated with the second computer security policy, that the second computer security policy does not meet a similarity threshold associated with the dataset used to train the machine learning model; and
   in response to the second computer security policy not meeting the similarity threshold, lowering a cyber security threat detection threshold for the second computer security policy.

10. The method of claim 2, wherein the machine learning model comprises a neural network model or a linear regression model.

11. One or more non-transitory, computer-readable media comprising instructions that, when executed by one or more processors, causes operations comprising:
   obtaining a first computer security policy comprising (i) an indication of a plurality of systems that to which a first computing system has access and (ii) a plurality of permissions granted to the first computing system;
   generating a graph embedding of the first computer security policy by using the first computer security policy to create a graph structure and generating the graph embedding based on the graph structure;

generating, via a machine learning model, based on the graph embedding of the first computer security policy, a likelihood indication of the first computing system's involvement in a cyber security incident, the machine learning model having been trained on a dataset that includes (i) representations of computer security policies associated with a plurality of computing systems and (ii) labels indicating urgency levels of cyber security incidents associated with the plurality of computer security policies, wherein the dataset further comprises second order access data indicating access of computing systems that are one degree removed from the plurality of computing systems;

based on the likelihood indication of the first computing system's involvement in the cyber security incident satisfying a first threshold, generating a recommendation to remove a first permission from the first computer security policy and lowering a cyber security threat detection threshold for the first computer security policy; and sending the recommendation to a user device.

12. The computer-readable media of claim 11, wherein the recommendation comprises a first threat level, and wherein the instructions, when executed, cause operations further comprising:

causing display of the first threat level via a user interface;

based on detecting a modification to the first computer security policy, generating a second threat level associated with the modified first computer security policy; and causing display of the second threat level via the user interface.

13. The computer-readable media of claim 11, wherein the dataset further comprises a plurality of closure codes associated with the cyber security incidents, wherein each closure code of the plurality of closure codes indicates whether an external malicious actor, an internal malicious actor, or no malicious actor was involved in a corresponding cyber security incident.

14. The computer-readable media of claim 13, wherein the instructions, when executed, cause operations further comprising:

generating, via the machine learning model and based on the graph embedding of the first computer security policy, an output indicating a predicted closure code for a future cyber security incident associated with the first computing system.

15. The computer-readable media of claim 11, wherein the recommendation further indicates lowering a cyber security threat detection threshold for the first computer security policy such that an intrusion detection system is more likely to flag activity associated with the first computing system as a cyber security incident.

16. The computer-readable media of claim 11, wherein the recommendation indicates removing an ability of the first computing system to access a database from the first computer security policy.

17. The computer-readable media of claim 11, wherein the recommendation indicates replacing the first permission indicated in the first computer security policy with a second permission.

18. The computer-readable media of claim 11, wherein the instructions, when executed, cause operations further comprising:

receiving, from the user device, a second computer security policy;

determining, based on a comparison with a counterfactual sample associated with the second computer security policy, that the second computer security policy does not meet a similarity threshold associated with the dataset used to train the machine learning model; and in response to the second computer security policy not meeting the similarity threshold, lowering a cyber security threat detection threshold for the second computer security policy.

19. The computer-readable media of claim 11, wherein the machine learning model comprises a neural network model or a linear regression model.

20. The computer-readable media of claim 11, wherein generating the likelihood indication of the first computing system's involvement in the cyber security incident further comprises inputting the graph embedding of the first computer security policy into the machine learning model.

\* \* \* \* \*